US 6,995,862 B1

(12) United States Patent
Murata et al.

(10) Patent No.: US 6,995,862 B1
(45) Date of Patent: Feb. 7, 2006

(54) IMAGE PROCESSING APPARATUS AND METHOD AND COMPUTER PROGRAM PRODUCT

(75) Inventors: Masahiko Murata, Chofu (JP); Tomoo Iizumi, Omiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/443,115

(22) Filed: Nov. 18, 1999

(30) Foreign Application Priority Data

Nov. 18, 1998  (JP) ................................. 10-328441

(51) Int. Cl.
*G06F 15/00* (2006.01)
(52) U.S. Cl. ..................... 358/1.9; 358/1.4; 358/450
(58) Field of Classification Search ................ 358/1.9, 358/3.23, 3.26, 1.15, 1.16, 1.17, 518, 515, 358/523, 538, 540, 445, 448, 469, 1.1, 1.5, 358/1.4, 1.12, 1.18, 450; 382/162, 167, 166, 382/164, 277
See application file for complete search history.

(56) References Cited

U.S. PATENT DOCUMENTS

| | | | | |
|---|---|---|---|---|
| 4,967,392 A | * | 10/1990 | Werner et al. ............... | 364/900 |
| 4,979,129 A | * | 12/1990 | Okubo et al. ................ | 364/518 |
| 5,841,898 A | * | 11/1998 | Liguori ........................ | 382/164 |
| 5,978,563 A | * | 11/1999 | Kawamoto et al. ......... | 358/1.18 |
| 6,226,000 B1 | * | 5/2001 | Richens et al. .............. | 345/419 |
| 6,304,333 B1 | * | 10/2001 | Shaked et al. ............... | 358/1.1 |
| 6,345,118 B1 | * | 2/2002 | Ideyama ...................... | 382/175 |
| 6,466,331 B1 | * | 10/2002 | Tai et al. ...................... | 358/1.9 |
| 6,753,878 B1 | * | 6/2004 | Heirich et al. ............... | 345/629 |

FOREIGN PATENT DOCUMENTS

| JP | 9-251362 | 9/1997 |
|---|---|---|
| JP | 09234905 A | 9/1997 |
| JP | 10-181092 A | 7/1998 |
| JP | 10-305623 | 11/1998 |

OTHER PUBLICATIONS

Office Action, dated Feb. 7, 2003, in JP Application 10-328441.

* cited by examiner

*Primary Examiner*—Mark Wallerson
(74) *Attorney, Agent, or Firm*—Fitzpatrick, Cella, Harper & Scinto

(57) ABSTRACT

If Y, M, C, and K color component images are serially generated by one color component image generating device in four steps, it takes much time to perform image processing for printing a one-page full-color image. This makes it impossible to increase the printing speed. In addition, since conversion to Y, M, C, and K data is performed before rendering, rendering logic cannot be faithfully implemented, resulting in poor color reproducibility. In order to solve these problems, image generating devices (103–105) respectively render R, G, and B color component images in bitmap memories 106 to 108, which are divided into areas in units of predetermined bands obtained by dividing a page, on the basis of a display list which is common to R, G, and B data and stored in a memory (102). The rendered color component images on a band basis are converted into C, M, Y, and K color component images by a color space converter (109) in synchronism with the operation of a printer engine.

13 Claims, 5 Drawing Sheets

IMAGE PROCESSING APPARATUS AND METHOD AND COMPUTER PROGRAM PRODUCT

BACKGROUND OF THE INVENTION

1. Field of the Invention

The present invention relates to an image processing apparatus and method and a computer program product.

2. Description of Related Art

In a page printer like a laser printer, and more specifically, a printer designed to print a full-color image, RGB data is converted into YMCK data first, Y, M, C, and K color component images are then formed, and a full-color image is formed in four print processes.

In the above printer, however, since Y, M, C, and K color component images are serially formed by one color component image generating device in four processes, it takes much time to perform image processing for printing a one-page full-color image. This makes it impossible to increase the print speed. In addition, since conversion to YMCK data is performed before rendering, rendering logic cannot be faithfully implemented, resulting in poor color reproducibility.

If a printer uses a print process in which four color component images are formed in parallel, printing must be started after all color component images corresponding to at least one page are formed. It therefore takes much time before the printer can start the first print operation. In addition, a large-capacity memory such as a data buffer or disk unit is required.

SUMMARY OF THE INVENTION

The present invention has been made to solve the above problems, and has as its object to provide an image processing apparatus and method and a storage medium, which can increase the image processing speed in generating images.

In order to achieve the above object, according to the present invention, there is provided an image processing apparatus characterized by comprising a plurality of rendering means for respectively rendering color component images on the basis of data common to the respective color components, and conversion means for converting the rendered color component images into color component images for printing in synchronism with operation of a printer engine.

It is another object of the present invention to provide an image processing apparatus and method and a storage medium, which can faithfully realize logic rendering.

It is still another object of the present invention to provide an image processing apparatus and method and a storage medium, which can speed up the start timing of printing.

It is still another object to provide an image processing apparatus and method and a storage medium, which have novel functions.

Other features and advantages of the present invention will be apparent from the following description taken in conjunction with the accompanying renderings, in which like reference characters designate the same or similar parts throughout the figures thereof.

DETAILED DESCRIPTION OF THE PREFERRED EMBODIMENTS

Image processing apparatuses according to embodiments of the present invention will be described in detail below with reference to the accompanying renderings.

First Embodiment

Figure 1:
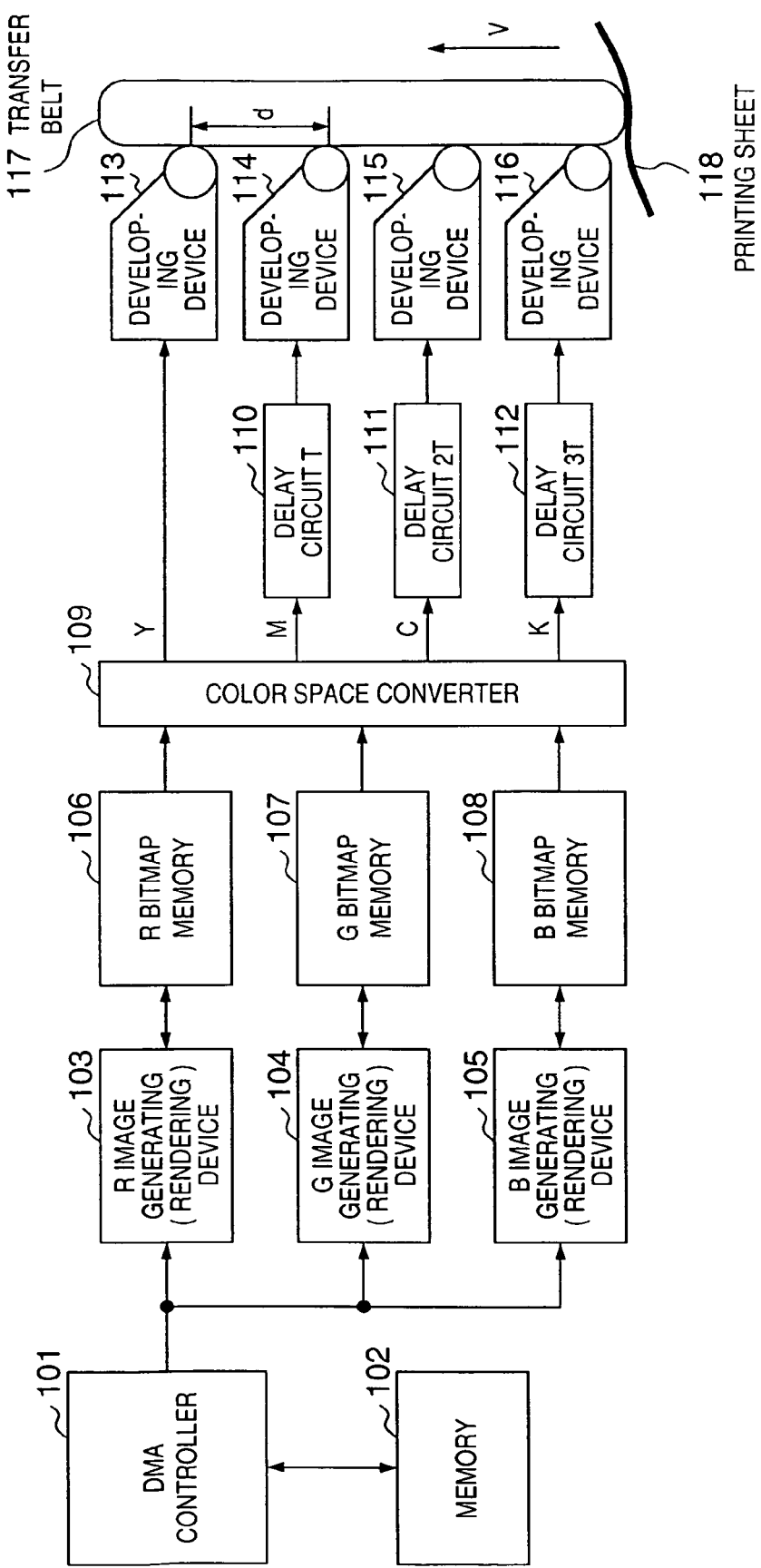
FIG. 1 is a block diagram showing the arrangement of a full-color page printer which is an image processing apparatus according to the first embodiment of the present invention.

FIG. 1 is a block diagram showing the arrangement of a full-color page printer which is an image processing apparatus according to the first embodiment of the present invention.

Referring to FIG. 1, a DMA (Direct Memory Access) controller 101 accesses a memory 102 in which a display list and rendering object data are stored. Reference numerals 103 to 105 denote image generating (rendering) devices for respectively generating R, G, and B color images as additive color mixture images. The red image generated (rendered) by the image generating device 103 on the basis of the display list and rendering object data read out from the memory 102 by the DMA controller 101 is stored in a bitmap memory 106. Likewise, the green image generated (rendered) by the image generating device 104 is stored in a bitmap memory 107. The blue image generated (rendered) by the image generating device 105 is stored in a bitmap memory 108.

The R, G, and B data of the same pixel which are respectively stored in the bitmap memories 106 to 108 are converted into Y, M, C, and K color data by a color space converter 109. These data are then sent to developing devices 113 to 116. The developing device 113 develops the print color Y, i.e., a yellow image. The developing device 114 develops the print color M, i.e., a magenta image. The developing device 115 develops the print color C, i.e., a cyan image. The developing device 116 develops the print color K, i.e., a black image. The respective developed color images are transferred onto a transfer belt 117 first, and then transferred onto a printing sheet 118. The four color component images superimposed/transferred on the printing sheet 118 are fixed by a thermal fixing device (not shown). The printing sheet 118 is then discharged outside the apparatus.

As shown in FIG. 1, a printer engine in this embodiment separately has Y, M, C, and K developing devices. That is, the printer of this embodiment is a so-called tandem color printer capable of high-speed printing by simultaneously printing four color component images. Each developing device irradiates a photosensitive drum in the developing device with a laser beam modulated by input image data to charge or discharge the photosensitive drum surface, thereby forming a latent image. Each developing device then develops this latent image with toner and transfers the developed image onto the transfer belt 117.

Delay circuits 110 to 112 respectively give magenta, cyan, and black data delays T, 2T, and 3T with respect to yellow component data (T=0) to correct the differences (T= d/V) between the formation timings of the respective color component images which are determined on the basis of the relationship between a moving speed V of the transfer belt 117 and distances d between the respective developing devices.

Figure 2:
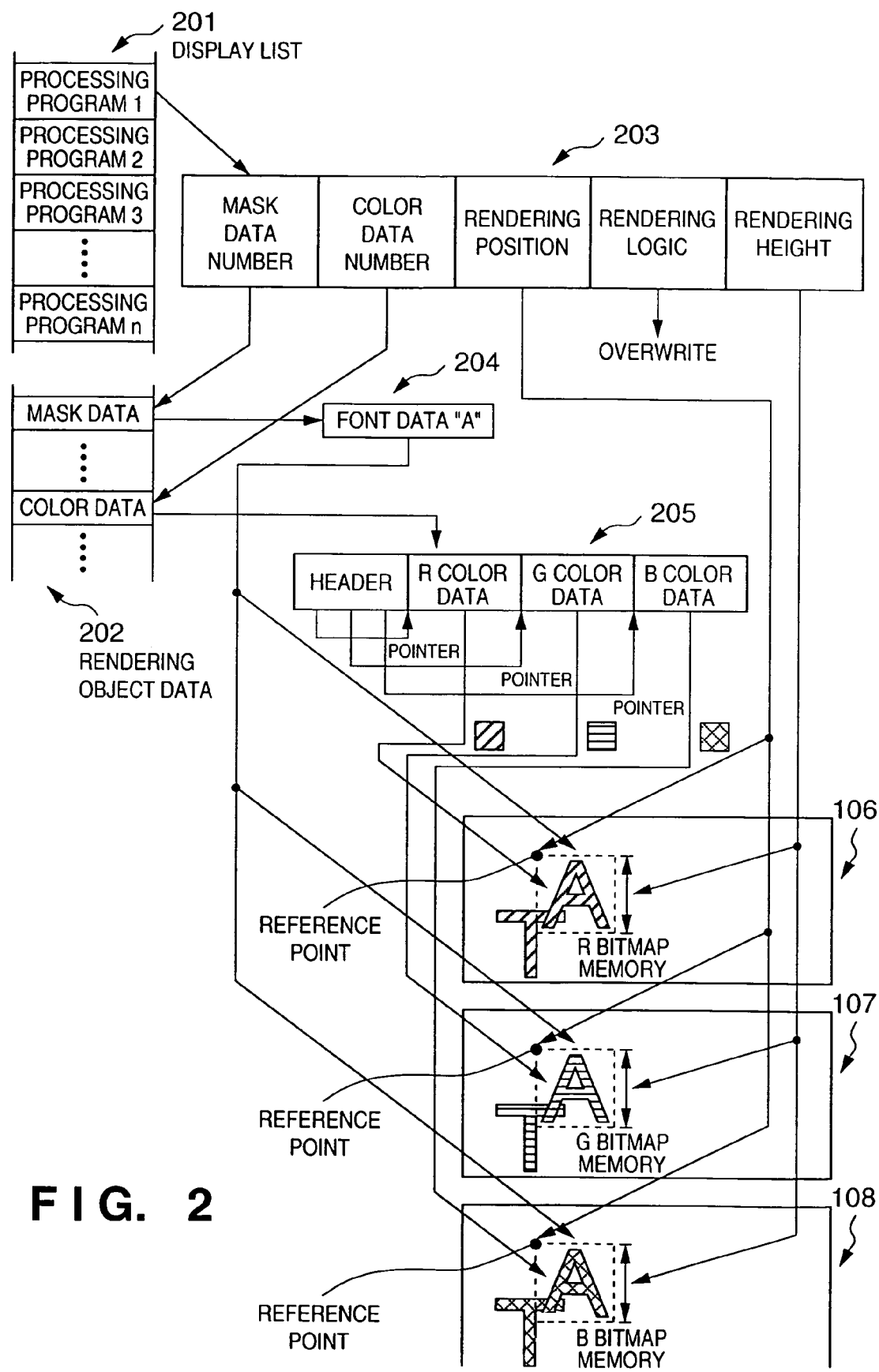
FIG. 2 is a view for explaining the rendering operation performed by each image generating device in FIG. 1.

FIG. 2 is a view for explaining the rendering by the image generating devices 103 to 105. Reference numeral 201 denotes a display list; 202, rendering object data; 203, a processing program format; 204, a mask data format; and 205, a color data format.

Figure 3:
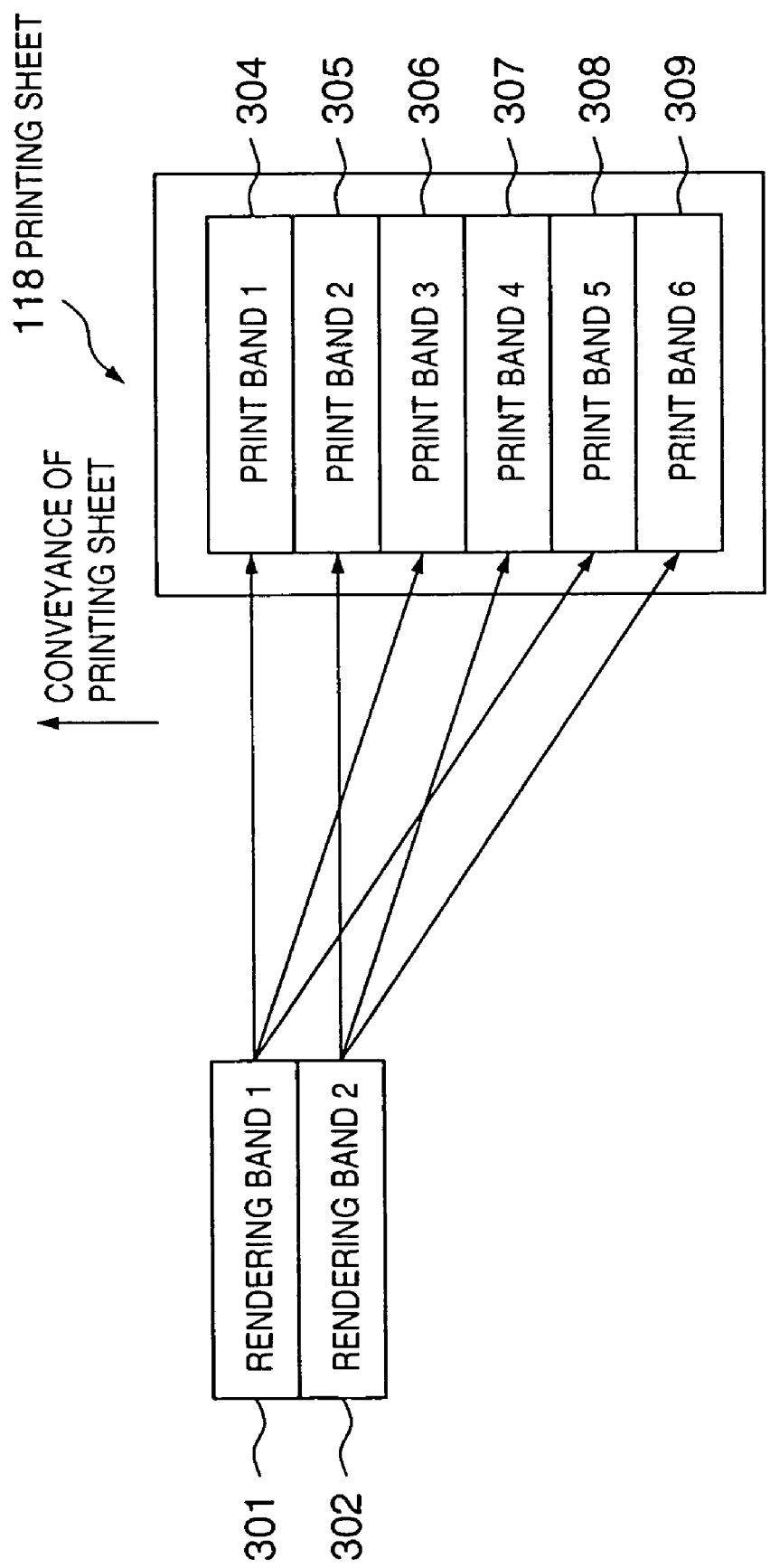
FIG. 3 is a view for explaining band rendering.

FIG. 3 is a view for explaining band rendering executed by this embodiment. Reference numerals 301 and 302 respectively denote rendering bands 1 and 2 formed on the bitmap memories 106 to 108; and 304 to 309, print bands 1 to 6 defined on a page.

In this embodiment, as shown in FIG. 3, a plurality of (six in FIG. 3) areas called "print bands" are defined on a page corresponding to one printing sheet 118 on which images are printed out. Each of the bitmap memories 106 to 108 has two areas as memory spaces corresponding to print bands. The apparatus renders data in units of bands in accordance with conveyance of a printing sheet.

Each of the image generating devices 103 to 105 forms a color component image in one of the above two memory spaces of a corresponding bitmap memory. A corresponding one of the R, G, and B color component images that have been already formed and stored is output from the other memory space to the color space converter 109. Note that the R, G, and B color component images are output from the bitmap memories 106 to 108 in synchronism with the operation of the printer engine mainly comprised of the above developing devices and transfer belt 117. When image formation in one memory space is complete and outputting of image data from the other memory space to the color space converter 109 is complete, image formation (rendering) corresponding to the next print band is performed in the memory space from which the image data is completely output, and image data is output from the memory space in which image formation is complete to the color space converter 109. That is, rendering bands alternate, and rendering and image output operation are repeated by the number of times corresponding to one page, thereby printing a one-page image.

The display list 201 of print data and source image data (rendering object data) 202 are prepared in the memory 102 in at least an amount corresponding to one page. In this state, print operation is started. When the print operation is started, the image generating devices 103 to 105 load the first processing program from the common display list 201 through the DMA controller 101. The display list 201 is constituted by a chain of processing programs. The generation of one object is defined by one processing program. Each image generating device sequentially processes this processing program chain to generate all objects, thereby forming a one-page image.

As indicated by reference numeral 203 in FIG. 2, each processing program is made up of pieces of information representing a mask data number, color data number, rendering position, rendering logic, and rendering height. Each image generating device calculates a memory address at which mask data is present on the basis of the mask data number and loads the mask data from the memory 102 through the DMA controller 101. Mask data is data representing the outer shape of a graphic pattern. There are various types of mask data including compressed images and graphic patterns as well as character fonts. These types are indicated as attributes in mask data. Each image generating device recognizes such an attribute and obtains a rendering object from the mask data. Referring to FIG. 2, the mask data 204 represents the character font "A".

Each image generating device calculates a memory address at which color data is present on the basis of the color data number, and loads the color data 205 from the memory 102 through the DMA controller 101. The color data 205 in this embodiment is constituted by frame-sequential R color data, G color data, and B color data. The header field at the start of the color data 205 contains offsets of the R, G, and B color data to the start of the color data 205. Each image generating device calculates the start address of the color data of the processing color by using the offset of the processing color as a pointer, and obtains the color data of the processing color from the memory 102 through the DMA controller 101.

There are also various types of color data, e.g., gray data purely representing the density and luminance of each of R, G, and B color components and human and scenery image data representing images by themselves. The type of color data is stored as an attribute in the color data as in the case of mask data. Each image generating device obtains a rendering color object by recognizing such an attribute. The following operation is performed by using gray-scale data.

In addition, color data is luminance information having a gray level represented by several bits, e.g., eight or four bits per pixel. A full-color image is expressed by combining pieces of luminance information of R, G, and B with resect to a single pixel. Although R, G, and B data are generally processed as pieces of luminance information, rendering may be performed by converting them into pieces of density information.

Each image generating device that has obtained the mask data 204 and color data 205 recognizes the reference point of a rendering object indicated by the rendering position of the processing program, and calculates the address of a pixel corresponding to the rendering position. Each image generating device then loads destination data as an object that has already been present in the bitmap memory at a location corresponding to the calculated address of the pixel. Each image generating device obtains data to be rendered by arithmetically operating the mask data, color data, and destination data corresponding to the same pixel, and writes the obtained data at the address of the destination data in the bitmap memory. With this operation, generation (rendering) of a one-pixel image is complete. In general, an image generating (rendering) operation is performed one pixel at a time or several pixels at a time. When an image is rendered up to the rendering width defined by the mask data 204 and the rendering height defined by the processing program, an image generating (rendering) operation corresponding to one processing program is complete.

In this embodiment, rendering is performed in units of print bands. The two rendering bands 301 and 302 are defined in each bitmap memory, and the operations of the respective rendering bands are alternately switched, thus rendering an image. For this reason, the display list 201 is also a chain of print band units.

When an image corresponding to a print band is formed in each bitmap memory, the image data in the bitmap memories are sequentially read out. As a consequence, R, G, and B data of the same pixel are input to the color space converter 109. The color space converter 109 then generates Y, M, C, and K data from the input R, G, and B data, and outputs them. This operation is basically performed in synchronism with the operation of the printer engine.

According to the above description, the display list 201 and source image data 202 are formed in the memory 102 in advance. These data may be print data described according to a page description language (PDL) which a CPU (not shown) in the full-color page printer inputs through an interface or the like or data downloaded from a host computer or network.

Although the rendering logic is described by taking "overwrite" as an example, logic rendering with excellent color reproducibility can be easily done by logic operation using mask data, color data, and destination data on the basis of R, G, and B color data as in this embodiment.

According to the above description, mask data and color data are respectively used as foreground data and background data. Each of these data types may include a plurality of data. Obviously, in this case, rendering logic variations further increase.

As described above, each image generating device forms an image in one of the rendering bands to be switched in units of print bands, and outputs an image from the other rendering band, in which the image has already been formed and no image is currently formed, to the color space converter 109. This makes it possible to print in full color by using bitmap memories each having a very small memory capacity. In addition, since the printer engine prints in units of bands, it can start printing when rendering of at least one band is complete. This printer can therefore begin first printing operation faster than a printer designed to start printing after one-page rendering is complete. Furthermore, since an object is rendered with RGB data, approximation processing, which is required to improve color reproducibility in rendering with YMCK data, is not required, and faithful rendering logic can be easily implemented. This makes it possible to realize color reproduction with higher accuracy. Since each color image is rendered on the basis of the common display list and rendering object data, the print data format can be simplified, and the data amount per page can be reduced. High-speed printing operation can be performed by generating images on the basis of these data. In addition, since data having undergone rendering operation can be immediately discarded, the data holding time can be shortened to allow efficient use of the memories.

Second Embodiment

An image processing apparatus according to the second embodiment of the present invention will be described below. The same reference numerals as in the first embodiment denote the same parts in the second embodiment, and a detailed description thereof will be omitted.

Figure 4:
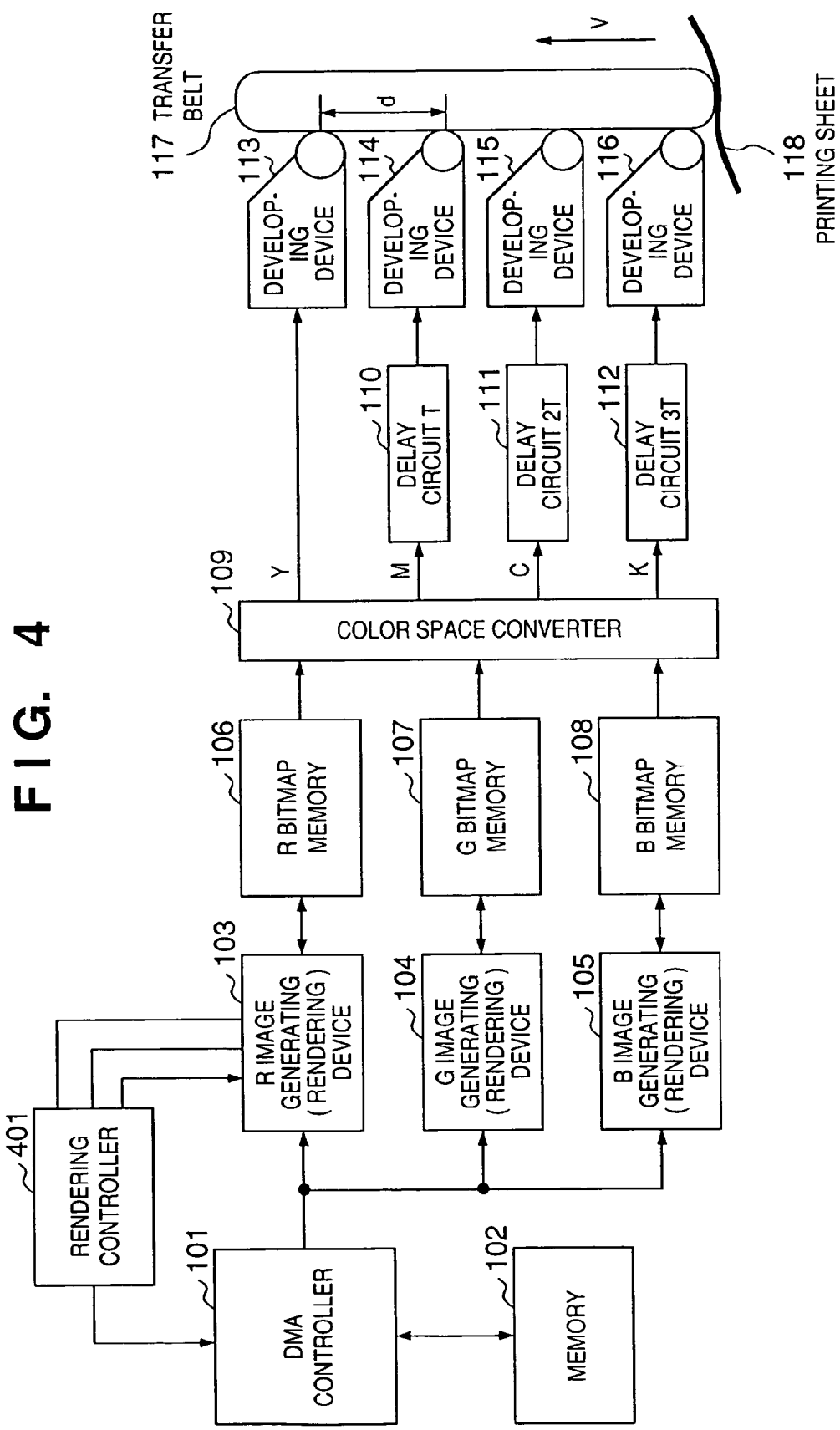
FIG. 4 is a block diagram showing the arrangement of a full-color page printer which is an image processing apparatus according to the second embodiment of the present invention.

FIG. 4 is a block diagram showing the arrangement of a full-color page printer which is an image processing apparatus according to the second embodiment of the present invention. The arrangement of the second embodiment is the same as that of the first embodiment except for a rendering controller 401.

Figure 5:
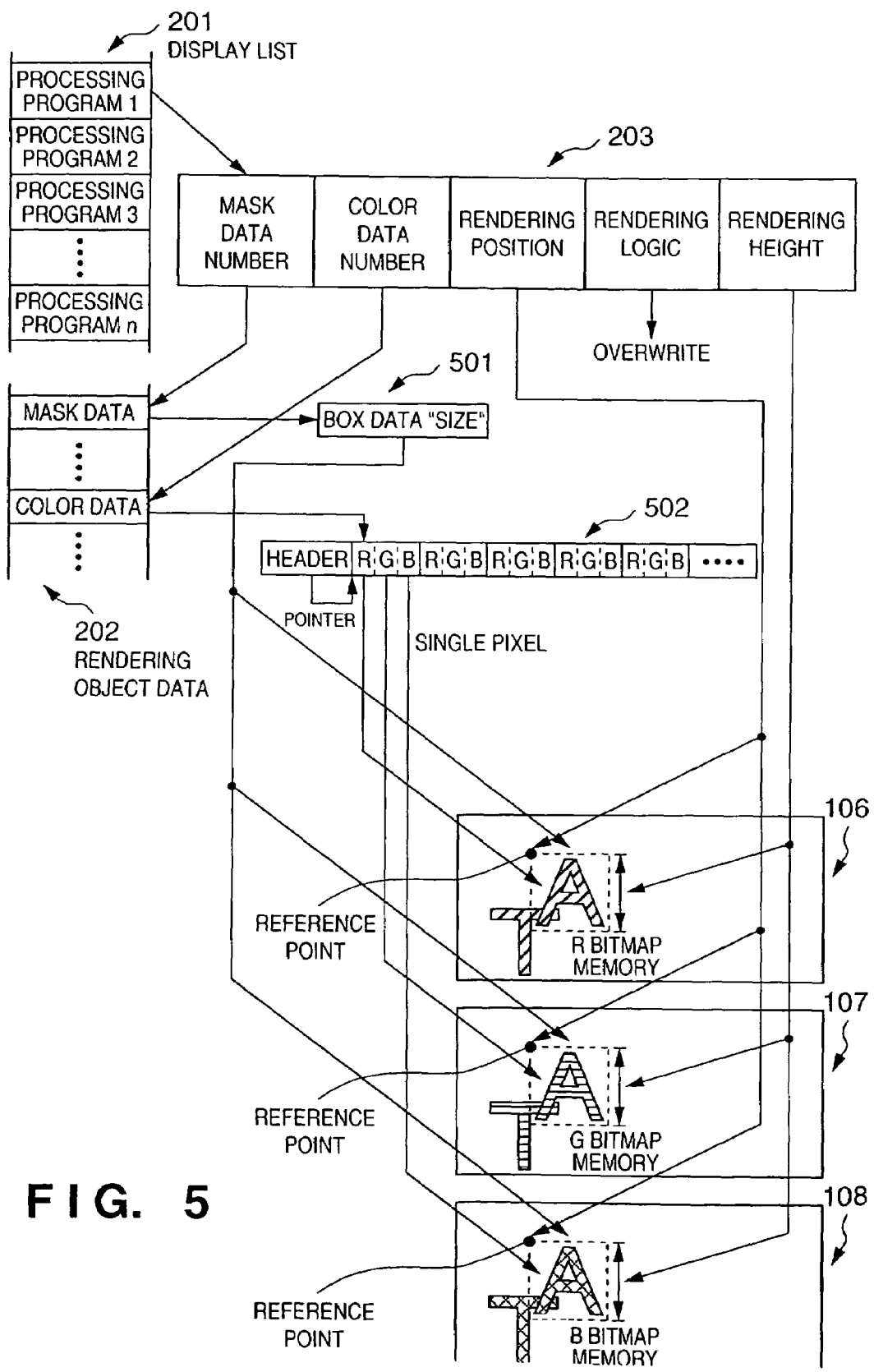
FIG. 5 is a view for explaining the rendering by each image generating device in FIG. 4.

FIG. 5 is a view for explaining the rendering operations of the image generating devices 103 to 105 in the second embodiment. Reference numeral 501 denotes mask data representing a box; and 502, color image data. Note that the color image data 502 is rendering object data comprising dot-sequential R, G, and B data.

A characteristic feature of this embodiment is that a processing program and rendering object data which are common to the respective image generating devices are supplied from the rendering controller 401 and simultaneously processed. The rendering operation of this embodiment will be described below with reference to FIGS. 4 and 5.

The rendering controller 401 controls a read from the memory 102 through the DMA controller 101 to control inputting of a processing program to each image generating device. The input processing program is held in each image generating device and uses information required for rendering, e.g., a rendering position, rendering logic, and rendering height.

The rendering controller 401 calculates addresses at which the mask data 501 and color image data 502 are located on the basis of the mask data number and color data number of the processing program, and inputs the mask data 501 to each image generating device through the DMA controller 101. Each image generating device to which the mask data 501 has been input recognizes the type of mask data from its attribute information, and generates a mask image corresponding to the type of mask data. Assume that the mask data 501 in this embodiment is box data indicating a rectangular area with numerical values representing a width and height.

The rendering controller 401 inputs the color image data 502 to each image generating device through the DMA controller 101. A characteristic feature of this embodiment is that the color image data 502 is made up of sets of R, G, and B data in units of pixels or sets each consisting of several pixels so as to have a sequential structure. The color image data 502 is made up of a header and continuous RGB dot-sequential data. The header contains attribute information and a pointer indicating the start address of actual data. Assume that the color image data 502 in this embodiment is color image data. The rendering controller 401 interprets the header field and calculates the start address of the color image data. The rendering controller 401 then inputs the color image data to each image generating device through the DMA controller 101. Note that each image generating device uses only the color image data of the color to be processed by each device.

In consideration of the performance of the image generating devices 103 to 105, sequential data may be made up of repetitions of R, G, and B data in units of pixels or access words each consisting of 8, 16, or 32 bits. The rendering controller 401 sequentially reads out color image data from the memory 102 and inputs them to the image generating devices 103 to 105 by synchronizing the operations of the image generating devices 103 to 105. This synchronization can be properly implemented by using either a signal RDY that is output from each image generating device to the rendering controller 401 upon completion of a preparation for reception of color image data or a signal WAIT which is output from each image generating device to the rendering controller 401 when a preparation for reception of color image data is not made. Since image data of the respective color components can be simultaneously generated from common data by using dot-sequential rendering object data, each memory can be efficiently accessed, and rendering objects can be efficiently generated.

The rendering controller 401 gives common data to the respective processing programs to simultaneously operate the respective image generating devices, thereby rendering in units of print bands. Since the operation after rendering is the same as that in the first embodiment, a description thereof will be omitted.

As described above, according to each embodiment, the following effects can be obtained.

(1) Rendering logic can be faithfully implemented because objects are rendered by using RGB data.

(2) Since RGB objects can be generated from a common display list and print element data (rendering object data), the data amount for printing can be reduced, and the number of memory accesses can be reduced. This can improve the utilization efficiency of the memories.

(3) Since images are generated (rendered) in units of print bands, each image memory need not have a large capacity, and the timing of first print can be quickened.

(4) The printing speed can be greatly increased by simultaneously generating R, G, and B color component images.

(5) Since R, G, and B color component images are simultaneously converted into Y, M, C, and K color component images, R, G, and B image data need to be read out from the image memories only once, and an image corresponding to the next print band can be immediately generated (rendered). This makes it possible to easily increase the printing speed.

Note that the display list is a list of print elements obtained by decomposing a print image and arranged in the order of occurrence. Print element data (rendering object data) is source image data representing a character, symbol, graphic pattern, color data, image data, or the like.

As has been described above, according to each of the first and second embodiments, an image processing apparatus and method which increase the speed of image processing for printing can be provided.

In addition, an image processing apparatus and method which can faithfully implement logic rendering can be provided.

Furthermore, an image processing apparatus and method which can quicken the print start timing can be provided.

Other Embodiment

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides the aforesaid functions according to the above embodiments being realized by executing the program codes which are read by a computer, the present invention includes a case where an OS (Operating System) or the like working on a computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
a plurality of rendering sections that respectively generate color component images on the basis of data common to the respective color components, wherein each rendering section executes a rendering including a process which, in accordance with rendering logic, carries out an operation of writing foreground data on destination data so as to generate one of the color component images as a red, green, or blue color component image, wherein the foreground data, destination data, and rendering logic are indicated by the common data, and wherein said plurality of rendering sections generate data in a pixel unit from the common data which includes at least one rendering object and a rendering position of the rendering object; and
a converter that converts the generated color component images into color component images for printing in synchronism with operation of a printer engine.

2. The apparatus according to claim 1, wherein each of said plurality of rendering sections comprises a memory having a memory capacity large enough to generate at least a two-band color component image obtained by dividing a page into bands.

3. The apparatus according to claim 2, wherein said memory is divided into areas in units of bands, and the divided areas are alternately used for the image rendering operation and outputting of an image to said converter.

4. The apparatus according to claim 1, further comprising a rendering controller that respectively supplies the common data to each of said plurality of rendering sections at substantially the same time and to control said plurality of rendering sections to simultaneously generate additive color mixture images.

5. The apparatus according to claim 1, further comprising an output section that outputs the color component images for printing to the printer engine in accordance with the operation of the printer engine.

6. The apparatus according to claim 5, wherein said output section comprises a delay section that compensates timing differences in forming the respective color component images in the printer engine.

7. The apparatus according to claim 1, wherein the data common to the respective color components is made up of a display list and print element data.

8. The apparatus according to claim 7, wherein the display list is a list of print elements obtained by dividing a print image and arranged in an order of occurrence.

9. The apparatus according to claim 7, wherein the print element data is image data representing one of a character, symbol, graphic pattern, color data, and image data.

10. An image processing method comprising the steps of:

generating color component images by operating a plurality of rendering sections, respectively, on the basis of data common to the respective color components, wherein each rendering section executes a rendering including a process which, in accordance with rendering logic, carries out an operation of writing foreground data on destination data so as to generate one of the color component images as a red, green, or blue color component image, wherein the foreground data, destination data, and rendering logic are indicated by the common data, and wherein the plurality of rendering sections generate data in a pixel unit from the common data which includes at least one rendering object and a rendering position of the rendering object; and converting the generated color component images into color component images for printing in synchronism with operation of a printer engine.

11. The method according to claim 10, further comprising the step of generating a color component image in units of bands by using a memory having a memory capacity enough to generate at least a two-band image.

12. The method according to claim 11, further comprising the step of dividing the memory into areas in units of bands, and alternately using the divided areas for image rendering in said generating step and outputting of an image for conversion in said converting step.

13. A computer program product storing a computer-readable medium comprising program code for an image processing method, said method comprising the steps of:

generating color component images by operating a plurality of rendering sections, respectively, on the basis of data common to the respective color components, wherein each rendering section executes a rendering including a process which, in accordance with rendering logic, carries out an operation of writing foreground data on destination data so as to generate one of the color component images as a red, green, or blue color component image, wherein the foreground data, destination data, and rendering logic are indicated by the common data, and wherein the plurality of rendering sections generate data in a pixel unit from the common data which includes at least one rendering object and a rendering position of the rendering object; and converting the generated color component images into color component images for printing in synchronism with operation of a printer engine.

* * * * *